US008176068B2

(12) United States Patent
Kunjithapatham et al.

(10) Patent No.: US 8,176,068 B2
(45) Date of Patent: May 8, 2012

(54) METHOD AND SYSTEM FOR SUGGESTING SEARCH QUERIES ON ELECTRONIC DEVICES

(75) Inventors: Anugeetha Kunjithapatham, Sunnyvale, CA (US); Mithun Sheshagiri, San Francisco, CA (US); Priyang Rathod, Mountain View, CA (US); Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 363 days.

(21) Appl. No.: 11/981,019

(22) Filed: Oct. 31, 2007

(65) Prior Publication Data

US 2009/0112848 A1  Apr. 30, 2009

(51) Int. Cl.
*G06F 17/30* (2006.01)
(52) U.S. Cl. ...................................... 707/766
(58) Field of Classification Search .................. None
See application file for complete search history.

(56) References Cited

U.S. PATENT DOCUMENTS

| | | | |
|---|---|---|---|
| 5,790,935 A | 8/1998 | Payton |
| 5,974,406 A | 10/1999 | Bisdikian et al. |
| 5,983,214 A | 11/1999 | Lang et al. |
| 5,983,237 A | 11/1999 | Jain et al. |
| 5,995,959 A | 11/1999 | Friedman et al. |
| 6,151,603 A | 11/2000 | Wolfe |
| 6,253,238 B1 | 6/2001 | Lauder et al. |
| 6,334,127 B1 | 12/2001 | Bieganski et al. |
| 6,412,073 B1 | 6/2002 | Rangan |
| 6,438,579 B1 | 8/2002 | Hosken |
| 6,480,844 B1 | 11/2002 | Cortes et al. |
| 6,637,028 B1 | 10/2003 | Voyticky et al. |
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard et al. |
| 6,826,512 B2 | 11/2004 | Dara-Abrams et al. |
| 6,842,877 B2 | 1/2005 | Robarts et al. |
| 6,954,755 B2 | 10/2005 | Reisman |
| 6,981,040 B1 | 12/2005 | Konig et al. |
| 7,028,024 B1 | 4/2006 | Kommers et al. |
| 7,054,875 B2 | 5/2006 | Keith, Jr. |
| 7,062,561 B1 | 6/2006 | Reisman |

(Continued)

FOREIGN PATENT DOCUMENTS

CN          1393107 A     1/2003

(Continued)

OTHER PUBLICATIONS

Apple Inc., Apple iTunes, http://www.apple.com/itunes/, Apr. 28, 2003.

(Continued)

*Primary Examiner* — Bai D. Vu
(74) *Attorney, Agent, or Firm* — Beyer Law Group LLP

(57) ABSTRACT

A method and system implementing a process for suggesting search queries on an electronic device is provided. The process involves displaying terms related to content accessed by a user for selection by the user, obtaining one or more key terms related to a user-selected term, and displaying the one or more key terms to the user as query suggestions corresponding to the selected term. Obtaining one or more key terms involves obtaining one or more key terms related to the selected term, based on local content information and/or external content information.

35 Claims, 8 Drawing Sheets

U.S. PATENT DOCUMENTS

| | | |
|---|---|---|
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 * | 6/2008 | Maybury et al. ............ 707/3 |
| 7,389,224 B1 | 6/2008 | Elworthy |
| 7,389,307 B2 | 6/2008 | Golding |
| 7,433,935 B1 | 10/2008 | Obert |
| 7,483,921 B2 * | 1/2009 | Tsuzuki et al. .............. 1/1 |
| 7,552,114 B2 * | 6/2009 | Zhang et al. ................ 1/1 |
| 7,565,345 B2 | 7/2009 | Bailey et al. |
| 7,593,921 B2 | 9/2009 | Goronzy et al. |
| 7,603,349 B1 | 10/2009 | Kraft et al. |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 * | 3/2010 | Scofield et al. ............. 707/709 |
| 7,716,158 B2 | 5/2010 | McConnell |
| 7,716,199 B2 | 5/2010 | Guha |
| 7,725,486 B2 * | 5/2010 | Tsuzuki et al. ............. 707/767 |
| 7,793,326 B2 | 9/2010 | McCoskey et al. |
| 7,899,915 B2 * | 3/2011 | Reisman ...................... 709/228 |
| 2001/0003214 A1 | 6/2001 | Shastri et al. |
| 2001/0023433 A1 | 9/2001 | Natsubori et al. |
| 2002/0022491 A1 | 2/2002 | McCann et al. |
| 2002/0026436 A1 | 2/2002 | Joory |
| 2002/0087535 A1 | 7/2002 | Kotcheff et al. |
| 2002/0161767 A1 | 10/2002 | Shapiro et al. |
| 2002/0162121 A1 | 10/2002 | Mitchell |
| 2003/0028889 A1 * | 2/2003 | McCoskey et al. ........... 725/91 |
| 2003/0033273 A1 | 2/2003 | Wyse |
| 2003/0105682 A1 | 6/2003 | Dicker et al. |
| 2003/0131013 A1 | 7/2003 | Pope et al. |
| 2003/0158855 A1 | 8/2003 | Farnham et al. |
| 2003/0172075 A1 | 9/2003 | Reisman |
| 2003/0184582 A1 | 10/2003 | Cohen |
| 2003/0221198 A1 | 11/2003 | Sloo |
| 2003/0229900 A1 | 12/2003 | Reisman |
| 2003/0231868 A1 | 12/2003 | Herley |
| 2004/0031058 A1 | 2/2004 | Reisman |
| 2004/0073944 A1 * | 4/2004 | Booth ........................... 725/131 |
| 2004/0194141 A1 | 9/2004 | Sanders |
| 2004/0244038 A1 | 12/2004 | Utsuki et al. |
| 2004/0249790 A1 * | 12/2004 | Komamura .................. 707/3 |
| 2005/0004910 A1 | 1/2005 | Trepess |
| 2005/0137996 A1 | 6/2005 | Billsus et al. |
| 2005/0144158 A1 | 6/2005 | Capper et al. |
| 2005/0154711 A1 | 7/2005 | McConnell |
| 2005/0160460 A1 * | 7/2005 | Fujiwara et al. ............ 725/52 |
| 2005/0177555 A1 | 8/2005 | Alpert et al. |
| 2005/0240580 A1 | 10/2005 | Zamir et al. |
| 2005/0246726 A1 | 11/2005 | Labrou et al. |
| 2005/0289599 A1 | 12/2005 | Matsuura et al. |
| 2006/0026152 A1 * | 2/2006 | Zeng et al. .................. 707/5 |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0133391 A1 | 6/2006 | Kang et al. |
| 2006/0136670 A1 | 6/2006 | Brown et al. |
| 2006/0156326 A1 * | 7/2006 | Goronzy et al. ............. 725/13 |
| 2006/0161542 A1 | 7/2006 | Cucerzan et al. |
| 2006/0195362 A1 | 8/2006 | Jacobi et al. |
| 2006/0242283 A1 | 10/2006 | Shaik et al. |
| 2007/0043703 A1 | 2/2007 | Bhattacharya et al. |
| 2007/0050346 A1 | 3/2007 | Goel et al. |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 * | 4/2007 | Cucerzan et al. .................. 707/3 |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0214123 A1 | 9/2007 | Messer et al. .................... 707/3 |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0082744 A1 | 4/2008 | Nakagawa |
| 2008/0114751 A1 | 5/2008 | Cramer et al. |
| 2008/0133501 A1 | 6/2008 | Andersen et al. |
| 2008/0133504 A1 | 6/2008 | Messer et al. |
| 2008/0162651 A1 * | 7/2008 | Madnani ....................... 709/206 |
| 2008/0162731 A1 | 7/2008 | Kauppinen et al. |
| 2008/0183596 A1 * | 7/2008 | Nash et al. ..................... 705/27 |
| 2008/0183681 A1 | 7/2008 | Messer et al. |
| 2008/0183698 A1 | 7/2008 | Messer et al. |
| 2008/0204595 A1 | 8/2008 | Rathod et al. |
| 2008/0208839 A1 | 8/2008 | Sheshagiri et al. .............. 707/3 |
| 2008/0235209 A1 | 9/2008 | Rathod et al. .................... 707/3 |
| 2008/0235393 A1 | 9/2008 | Kunjithapatham et al. |
| 2008/0242279 A1 | 10/2008 | Ramer et al. |
| 2008/0250010 A1 | 10/2008 | Rathod et al. |
| 2008/0266449 A1 | 10/2008 | Rathod et al. ................. 348/468 |
| 2008/0288641 A1 | 11/2008 | Messer et al. |
| 2009/0029687 A1 | 1/2009 | Ramer et al. |
| 2009/0055393 A1 | 2/2009 | Messer et al. |
| 2009/0077065 A1 | 3/2009 | Song et al. |
| 2009/0112848 A1 | 4/2009 | Kunjithapatham et al. |
| 2010/0070895 A1 | 3/2010 | Messer |
| 2010/0191619 A1 | 7/2010 | Dicker et al. |

FOREIGN PATENT DOCUMENTS

| | | |
|---|---|---|
| CN | 1723458 A | 1/2006 |
| CN | 1808430 | 7/2006 |
| JP | 2003-099442 A | 4/2003 |
| KR | 10-2002-0005147 A | 1/2002 |
| KR | 10-2002-0006810 A | 1/2002 |
| KR | 10-2004-0052339 A | 6/2004 |
| KR | 10-2006-0027226 A | 3/2006 |
| WO | WO 01/37465 A2 | 5/2001 |
| WO | WO 02/43310 A2 | 5/2002 |
| WO | WO 2005/055196 A2 | 6/2005 |
| WO | WO 2007/004110 A2 | 1/2007 |

OTHER PUBLICATIONS

Babaguchi, N. et al., "Intermodal collaboration: A strategy for semantic content analysis for broadcasted sports video," Sep. 2003, pp. 13-16.

Brill, E., "A simple rule-based part of speech tagger," Mar. 1992, Proceedings of the Third Conference on Applied Natural Language Processing, Trento, Italy.

Google Inc., Google Search Engine, http://www.google.com, Aug. 1998.

Google Inc., Google Desktop Search, http://desktop.google.com, Oct. 15, 2004.

Henzinger, M. et al, "Query-free news search," May 2003, Proceedings on the 12th International Conference on World Wide Web, Budapest, Hungary.

Livingston, K. et al., "Beyond broadcast: a demo," Jan. 2003, In Proceedings of the 8th international Conference on intelligent User interfaces, ACM Press, New York, NY, 325-325.

Microsoft Corporation, Microsoft Windows Media Player, http://www.microsoft.com/windows/windowsmedia/, Feb. 1999.

Microsoft Corporation, MSN TV, http://www.webtv.com/pc, Feb. 2006.

Opera Software ASA, Opera Browser for Devices, http://www.opera.com/products/devices/, Mar. 2006.

Rau Lisa, F. et al, "Domain-independent summarization of news," Jun. 1994, In Summarizing Text for Intelligent Communication, pp. 71-75, Dagstuhl, Germany.

Spalti, M., "Finding and Managing Web Content with Copernic 2000," Sep. 2000, Library Computing, Westport, pp. 217-221, vol. 18, No. 3.

Tjondronegoro, D. et al., "Extensible detection and indexing of highlight events in broadcasted sports video," Jan. 2006, Proceedings of the 29th Australasian Computer Science Conference, Hobart, Australia.

Wachman, J. et al., "Tools for Browsing a TV Situation Comedy Based on Content Specific Attributes," Mar. 2001, Multimedia Tools and Applications, v. 13 n. 3, p. 255-284.

Yahoo Search Engine, http://search.yahoo.com, Dec. 1998.

Zhuang, Y. et al, "Applying semantic association to support content-based video retrieval," Oct. 1998, International workshop on Very Low Bitrate Video Coding (VLBV'98).

Ask.com, http://www.ask.com, Dec. 1998.

Copernic Inc., http://www.copernic.com/en/products/desktop-search/index.html, Sep. 2004.

Google Inc., http://www.google.com/webhp?complete=1&hl=en, Dec. 2004.

Notification of Transmittal of the International Search Report and the Written Opinion of the International Search Authority Application No. PCT/KR2008/000537 dated May 15, 2008, 16 pages.

Notification of Transmittal of the International Search Report and the Written Opinion of the International Searching Authority for International Application No. PCT/KR2008/001558, dated Jun. 26, 2008, 10 pages.

Chinese Office Action dated Aug. 14, 2009 issued in Chinese Patent Application No. 2008100826213 (English-language translation included).

Realnetworks. Inc., http://www.real.com, download Sep. 19, 2008, United States.

Microsoft Corporation, Microsoft Windows Media Player 10, http://www.microsoft.com/windows/windowsmedia/mp10, downloaded Sep. 19, 2008, United States.

U.S. Non-final Office Action for U.S. Appl. No. 11/732,887 mailed on Jun. 5, 2009.

U.S. Final Office Action for U.S. Appl. No. 11/732,887 mailed on Dec. 4, 2009.

Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg, Germany.

Moraveji, N. et al., "DynaLine: A Non-Disruptive TV User Interface for Passive Browsing of Internet Video," Microsoft Research Technical Report, 2006, pp. 1-4, United States.

U.S. Non-final Office Action for U.S. Appl. No. 12/056,184 mailed on Jun. 11, 2010.

U.S. Final Office Action for U.S. Appl. No. 12/056,184 mailed on Nov. 23, 2010.

U.S. Non-Final Office Action for U.S. Appl. No. 11/726,340 mailed May 19, 2009.

Livingston, K. et al., "Beyond Broadcast," 8th International Conference on Intelligent User Interfaces, Jan. 2003, pp. 260-262, Association for Computing Machinery, New York, NY.

Copernic Inc., Copernic Search Engine for your PC, http://www.copernic.com, Sep. 19, 2008, US.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

U.S. Final Office Action for U.S. Appl. No. 11/969,778 mailed on Sep. 2, 2010.

U.S. Non-final Office Action for U.S. Appl. No. 11/969,778 mailed on Apr. 19, 2010.

Notification of Transmittal of the International Search Report and the Written Opinion of the International Searching Authority; International Search Report and Written Opinion of the International Searching Authority for Application No. PCT/KR2008/000537 dated May 15, 2008, 16 pages.

U.S. Non-final Office Action for U.S. Appl. No. 11/803,826 mailed on Jul. 24, 2009.

Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

U.S. Final Office Action for U.S. Appl. No. 11/633,880 mailed Oct. 28, 2010.

U.S. Final Office Action for U.S. Appl. No. 11/713,350 mailed Sep. 9, 2010.

U.S. Non-final Office Action for U.S. Appl. No. 11/633,880 mailed May 11, 2010.

AOL LLC, http://www.aol.com, downloaded Sep. 19, 2008, pp. 1-2, United States.

U.S. Advisory Action for U.S. Appl. No. 11/633,880 mailed Nov. 25, 2009.

U.S. Non-final Office Action for U.S. Appl. No. 11/900,847 mailed Oct. 28, 2009.

"Placement in the DMOZ.org directory—Pure Power", DMOZ / Google Directory, posted on Apr. 30, 2005, p. 1, http://www.alifx.net/weblog/13.

U.S. Office Action for U.S. Appl. No. 11/633,880 mailed Jan. 6, 2009.

U.S. Office Action for U.S. Appl. No. 11/633,880 mailed Aug. 10, 2009.

U.S. Final Office Action for U.S. Appl. No. 11/713,350 mailed Mar. 2, 2009.

U.S. Final Office Action for U.S. Appl. No. 11/713,350 mailed Aug. 14, 2009.

U.S. Non-final Office Action for U.S. Appl. No. 11/725,865 mailed Oct. 16, 2009.

U.S. Final Office Action for U.S. Appl. No. 11/725,865 mailed Mar. 16, 2010.

U.S. Non-final Office Action for U.S. Appl. No. 11/713,350 mailed Mar. 8, 2010.

U.S. Non-final Office Action for U.S. Appl. No. 11/803,826 mailed on Mar. 3, 2010.

U.S. Office Action for U.S. Appl. No. 11/726,340 mailed Oct. 14, 2010.

U.S. Office Action for U.S. Appl. No. 11/726,340 mailed Feb. 14, 2011.

U.S. Office Action for U.S. Appl. No. 11/726,340 mailed Dec. 9, 2009.

U.S. Office Action for U.S. Appl. No. 12/263,089 mailed Mar. 25, 2011.

U.S. Office Action for U.S. Appl. No. 11/725,865 mailed Mar. 4, 2011.

U.S. Office Action for U.S. Appl. No. 11/633,880 mailed Mar. 17, 2011.

U.S. Office Action for U.S. Appl. No. 11/803,826 mailed Jun. 1, 2011.

U.S. Office Action for U.S. Appl. No. 11/969,778 mailed Jun. 15, 2011.

Office Action dated Jun. 27, 2011 from U.S. Appl. No. 11/725,865.

Office Action dated Jul. 6, 2011 from U.S. Appl. No. 11/789,609.

Office Action dated Aug. 2, 2011 from U.S. Appl. No. 11/713,312.

Office Action dated Mar. 25, 2010 from Chinese Patent Application No. 200810082621.3, 7pp., China (English-language translation includedaa—15 pp).

Tivo Inc., http://www.tivo.com, downloaded Sep. 19, 2008, 1 page.

"Computing Meng Individual Project, ANSES—Automatic News Summarization and Extraction System," http://mmis.doc.ic.ac.uk/pr-1.wong-2002/overview.html, downloaded Sep. 24, 2008, 4 pages.

Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.

Miura, K. et al., "Automatic Generation of a Multimedia Encyclopedia from TV Programs by Using Closed Captions and Detecting Principal Viedo Objects, "Proceedings of the Eigth IEEE International Sympsosium on Miltumedia (ISM ' 06), 2006, IEEE, 8 pages.

Office Action dated Aug. 19, 2011 from U.S. Appl. No. 11/821,938.

Final Office Action dated Sep. 1, 2011 from U.S. Appl. No. 12/263,089.

Office Action dated Sep. 8, 2011 from U.S. Appl. No. 12/544,994.

Final Office Action dated Sep. 21, 2011 from U.S. Appl. No. 11/633,880.

Final Office Action dated Sep. 27, 2011 from U.S. Appl. No. 11/969,778.

Notice of Allowance dated Nov. 1, 2011 from U.S. Appl. No. 11/821,938.

Chinese Office Action dated Feb. 1, 2011 from Chinese Application No. 2007101962371.

* cited by examiner

60 Architecture

METHOD AND SYSTEM FOR SUGGESTING SEARCH QUERIES ON ELECTRONIC DEVICES

FIELD OF THE INVENTION

The present invention relates to providing information on electronic devices, and in particular to searching for information using consumer electronic (CE) devices.

BACKGROUND OF THE INVENTION

The number of networked electronic devices, such as consumer electronics (CE) in home networks, is on the rise and so is the amount of content and data stored therein. Consumers store and access several types of content (e.g., movies, photos, broadcast television (TV), cable TV programs) on/via such devices in their home networks. Further, the amount of information available on the Internet via the World Wide Web is on the rise.

Given the large amount of content available in a home network and on the Internet, it is very likely that consumers (users) can find extensive information on the Internet related to at least a portion of the data and content stored on their home devices. Moreover, many users are as interested in searching information on the Internet as they are in accessing data and content on their home networks, especially using CE devices which do not provide typical keyboard/mouse input devices.

BRIEF SUMMARY OF THE INVENTION

The present invention provides a method and system for suggesting search queries on an electronic device. In one embodiment this involves displaying terms related to content accessed by a user for selection by the user, obtaining one or more of key terms related to a user-selected term, and displaying the key terms to the user as query suggestions corresponding to the selected term.

Obtaining one or more of key terms may include obtaining one or more terms based on locally available content information and/or information available on external sources. In one implementation, obtaining key terms includes obtaining key terms related to the selected term based on locally available content information, obtaining key terms related to the selected term based on information available on external sources, and aggregating the obtained key terms for display as query suggestions.

These and other features, aspects and advantages of the present invention will become understood with reference to the following description, appended claims and accompanying figures.

DETAILED DESCRIPTION OF THE INVENTION

The present invention provides a method and system for suggesting search queries on electronic devices. One embodiment involves suggesting search queries, and assisting users to refine and edit suggested search queries, using electronic devices such as CE devices. Search query suggestion and query refinement are based on user context. Considering the user context allows suggesting and refining queries, relevant to user needs and interests. In one example, the user context includes information about the content accessed by the user using a CE device (e.g., closed caption information for a TV program accessed by the user), and other information on the Internet about that content.

Figure 1:
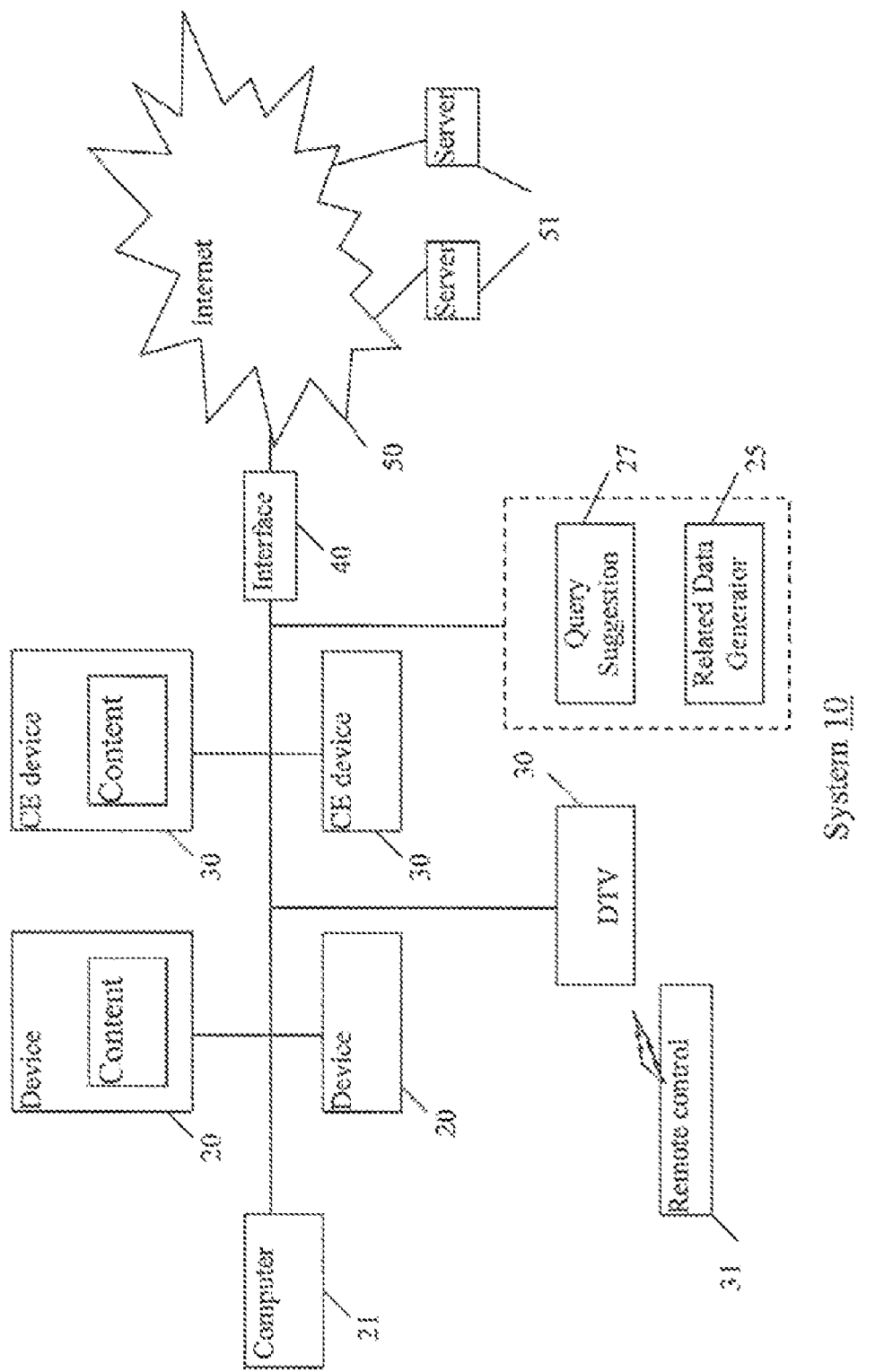
FIG. 1 shows a functional architecture of an example network/system embodying aspects of the present invention.

An implementation for CE devices in a local area network (LAN), such as a home network, is described below, however the present invention is useful with other electronic devices, and electronic devices that are not in a LAN but have access to the Internet. FIG. 1 shows a functional architecture of an example network/system 10, such as a LAN of home devices, embodying aspects of the present invention. The network/system 10 comprises devices 20 such as appliances, a personal computer (PC) 21, CE devices 30 which may include content, and an interface 40 that connects the network/system 10 to an external network 50 (e.g., another local network, the Internet). The external network 50 can be connected to one or more servers 51. The network/system 10 can implement the UPnP protocol or other network communication protocols (e.g., Jini, HAVi, IEEE 1394, etc.). The network/system 10 can be a wireless network, a wired network, or a combination thereof. Examples of CE devices include digital televisions (DTVs, PDAs, media players, etc.).

The network/system 10 further includes a related data generator function 25 that can generate keywords. In one example, the user context includes closed caption (CC) information for a TV program accessed by the user, and other information on the Internet about that content. In this example, the related data generator function 25 generates keywords related to a content accessed by a user such a program being watched by a user on a CE device 30 such as a DTV. The related data generator function 25 can also generate keywords based on one or more of: user history (e.g., keywords selected by the user previously), user profile, content previously accessed by the user, etc. The related data generator function 25 can be implemented, e.g., in a stand-alone module, in a device 20 such as a set-top box or in a CE device 30 such as a DTV. A user interface (UI) can be displayed on a device in the network/system 10 capable of displaying information, such as a CE device 30.

The network/system 10 further includes a query suggestion function 27 that suggests search queries (and/or refinements to already suggested queries) based on content accessed and based on related information on the Internet. The query suggestion function 27 reduces user effort in entering or refining a search query using a remote control type input device such as a remote control 31 for the DTV 30. The query suggestion function 27 provides suggestions when the user attempts to enter a new query, or refine a suggested query. The user can use a remote control input device to select among suggested queries and thereby auto-complete a query.

Figure 2:
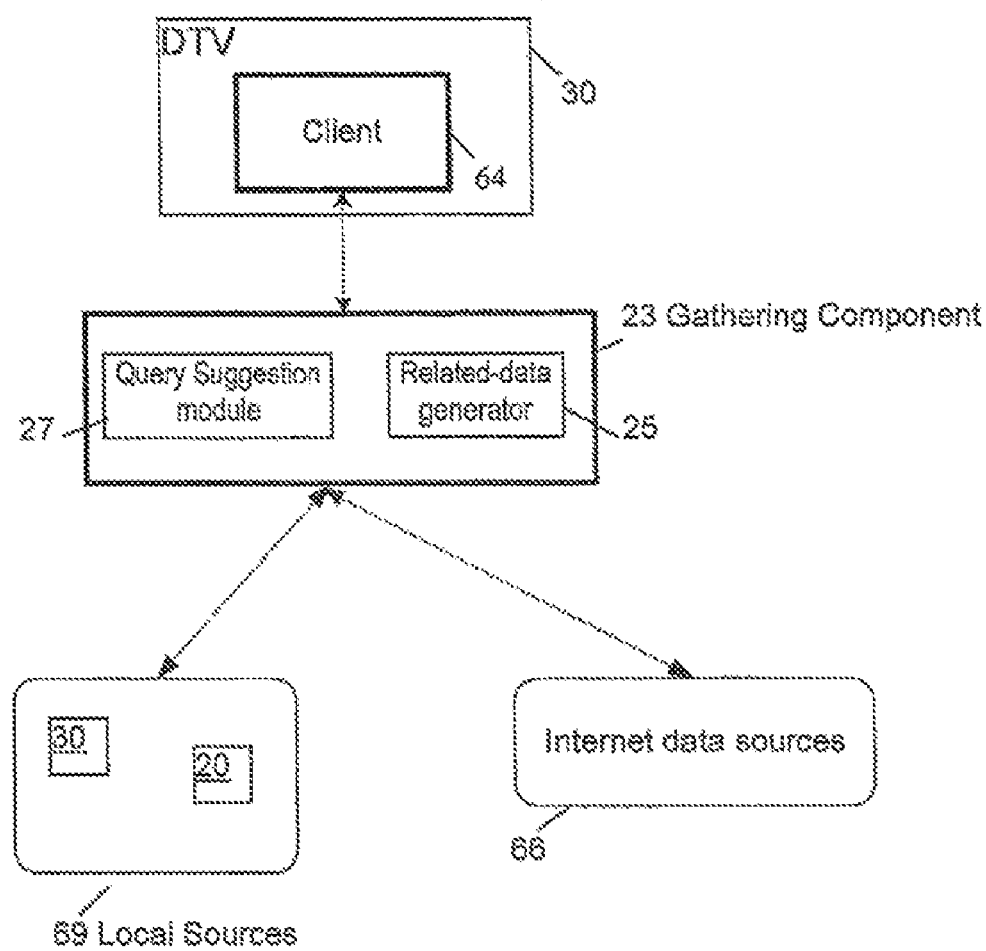
FIG. 2 shows an architecture in which a related data generator module and a query suggestion module are implemented in an information gathering component, according to an embodiment of the present invention.

FIG. 2 shows an architecture 60 in which the related data generator function 25 and the query suggestion function 27 are implemented in an information gathering component 23 (such as a software module in a CE device), according to an embodiment of the present invention. The architecture 60 provides support for suggesting/refining queries via a user interface provided by a client module 64 that, in this example, is implemented in a CE device such as the DTV 30.

In one example, the client module 64 enables the user to obtain desired information from, e.g., the Internet using a simple and intuitive Graphical User Interface (GUI) application, including:

1. Mapping the functionalities that support information search to a small number of keys (e.g., mapping such functionalities to a few keys of a TV remote control 31, as an example for receiving user input when using a DTV 30 for information access).

2. Enabling the user to express interest in obtaining additional information related to information currently accessed by the user (e.g., providing an info button on the remote control 31 for the user to press, and mapping this action into a "more info" request, etc.).

3. Enabling the user to indicate the specific type of additional information the user is looking for, after the user has expressed interest in accessing additional information. An example involves displaying a set of keywords related to the data that the user has expressed interest in (e.g., a TV program or media content the user is accessing). Then, providing a combination of keys (e.g., up/down/right/left arrow keys) on a remote control 31 for the user to select one of the keywords as a search query.

4. Enabling the user to refine or edit a suggested keyword/search query, such as by displaying a set of additional query suggestions that contain, or are related to, the selected keyword and providing a combination of the arrow keys (up/down/right/left arrows) on the remote control 31 for the user to select one of the query suggestions. The GUI allows the user to refine the search queries as many times as the user desires by just repeating the process described above. Further, the query suggestions are displayed in an editable text box that allows the user to delete existing characters or enter new characters to modify the query as desired. This can be performed using e.g., a wireless keyboard or a remote control that has a inbuilt keypad.

5. Performing a search based on a formulated query. Then enabling the user to access the search results by displaying a list of search results corresponding to the keyword previously selected by the user. Then, providing a combination of arrow keys (up/down/right/left arrows) on the remote control device 31 for the user to select one of the refined search results. An example of a search result includes a link to a web page containing information about the search query, wherein the title of the web page is displayed to the user on the GUI.

The user utilizes the client module 64 to access certain content, and the related data generator function 25 obtains information related to the accessed content for display to the user. The user then requests that the information gathering component 23 provide more information about the accessed content. For example, the user utilizes the client module 64 to request that the information gathering component 23 provide more information from Internet data sources 66 about a pre-recorded/broadcast TV program the user is watching on the DTV 30.

Using the client module 64, the user can choose, edit or enter new queries (such as the suggested keywords/categories) with minimal effort on a CE device that may not have a keyboard/mouse. Specifically, the query suggestion function 27 suggests and displays queries including keywords related to the TV program and information categories related to those keywords. Using the suggested keywords and categories as search queries, users can seamlessly browse/search for related information available on the Internet through their CE devices by simply selecting among the suggested queries for searching. The query suggestion function 27 identifies many relevant search queries, and allows the user to edit a suggested query or enter a new query.

Figure 3:
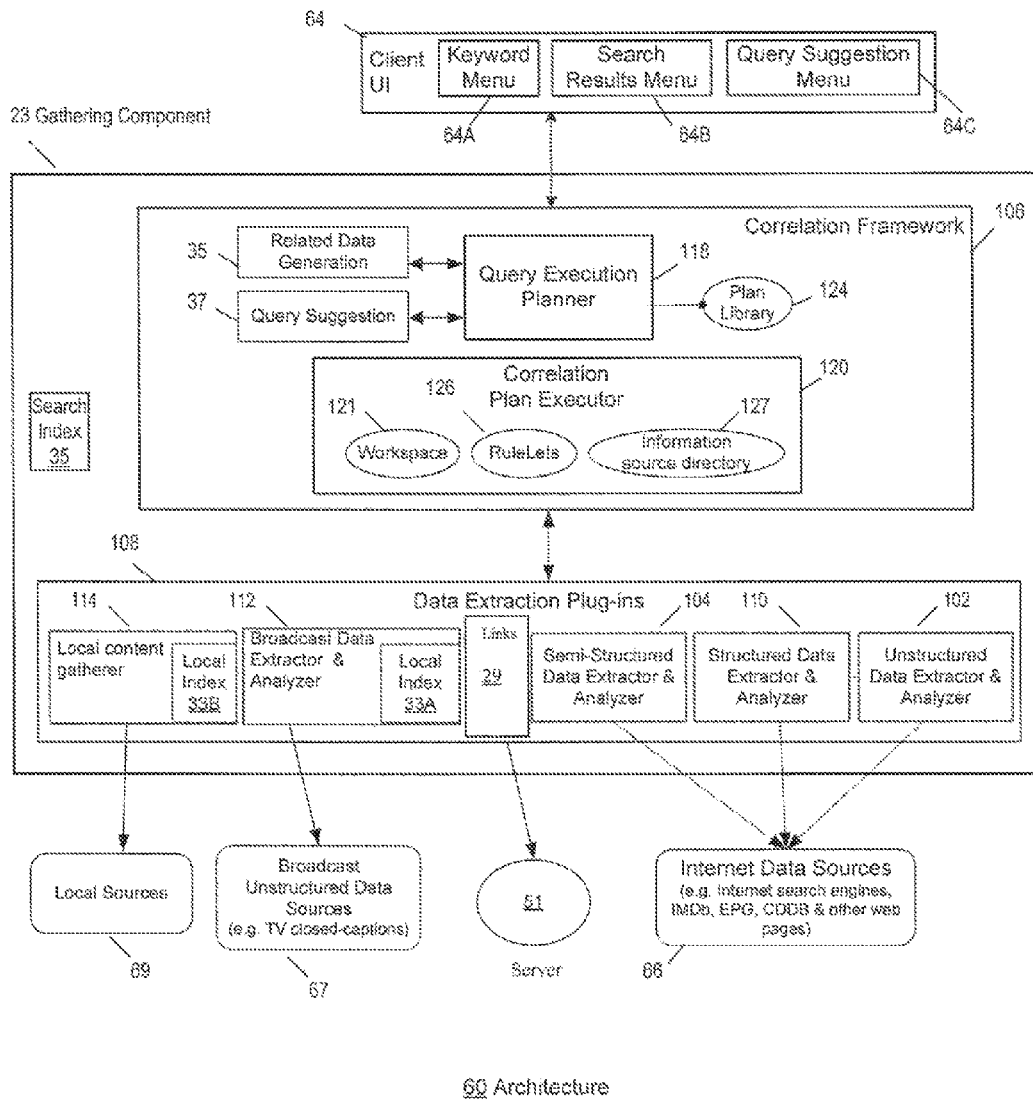
FIG. 3 shows a functional block diagram of an example information gathering component for suggesting search queries, according to the present invention.

Example processes for generating related data and query suggestion, implemented by the information gathering component 23 according to the present invention, are described below. FIG. 3 shows an example of the information gathering component 23 of the architecture 60, configured for TV hardware or a set-top box platform, for suggesting/refining queries. A related data generator function 35 obtains information related to accessed content for display to the user via the client module 64. The client module 64 further allows the user to request more information about the accessed content. A query suggestion function 37 provides more information by implementing query suggestion/refinement, as described below.

In the example shown in FIG. 3, the information gathering component 23 includes a Correlation Framework (CF) 106 that implements the related data generator function 35 and the query suggestion function 37. The CF 106 provides interfaces and functionalities for use by the related data generation function 35 and the query suggestion function 37, to obtain information related to accessed content and resolve user requests for various types of information obtained by data extraction functions 108 from the local sources 69 and Internet sources 66. Local information includes information available on local sources 69 such as devices 20, 21, 30, in the network/system 10 (FIG. 1). Internet information includes information available on the Internet sources 66 which can be obtained via search engines, web sites, etc., described in more detail further below.

Said interfaces and functionalities of the CF 106 are implemented by a Query Execution Planner (QEP) 118, a Plan Library 124, a Correlation Plan Executor (CPE) 120, one or more RuleLets 126 and an Information Source Directory 127.

The QEP 118 provides interfaces between the related data generation function 35 and the query suggestion function 37, and various functions of the CF 106. The Plan Library 124 includes various plans described, e.g., in simple XML-like format. Each QEP interface is associated with a particular plan; when a QEP interface is called (e.g., executed by the module 64 or the functions 35, 37), the QEP 118 passes on the associated plan to the CPE 120 along with any data passed on by the calling function/module. The CPE 120 executes the plan passed on by the QEP 118 using data extraction functions (plug-ins) 108.

A plan specifies the steps to be executed in order to resolve a particular type of query. A plan-step in a plan specifies a routine (i.e., a RuleLet 126) to be executed and optionally specifies the type of required data and the scope of the output result (e.g., whether the data required should be from the Internet sources 66 and/or the local sources 69). The RuleLets 126 are specialized processes that execute a specific task (e.g., obtaining data from the data extraction plug-in, merging data obtained from different data extraction plug-ins, etc.). A workspace 121 is used by the CF 106 to temporarily store the results of executing each plan-step in a plan and input to subsequent steps as needed. The Information Source Directory 127 maintains information about which data extraction plug-in (DEP) 108 should be used to extract a particular type of data.

The DEP 108 provides functionalities to extract data from different sources including the local sources 69 (e.g., home devices (media) repository) and the Internet sources 66. The DEP 108 includes an Unstructured Data Extractor & Analyzer (UDEA) 102, a Semi-Structured Data Extractor & Analyzer (SSDEA) 104, a Structured Data Extractor & Analyzer (SDEA) 110, a Broadcast Data Extractor & Analyzer (BDEA) 112 and a Local Content Gatherer (LCG) 114.

The UDEA 102 provides functionalities to extract data from general websites on the Internet via Internet search engines such as Google, Yahoo, etc. In one example, when a user selects a keyword from related information displayed by the client module 64, the keyword is passed to the CF 106, and the CF 106 provides the keyword to the UDEA 102 for data extraction. The UDEA 102 passes the selected keyword to a search engine (e.g., API provided by the "Yahoo" search engine) in the Internet data sources 66, to obtain related web-links for the selected keyword and returns the search results to the CF 106 for further processing or for providing to the user.

The SSDEA 104 provides functionalities to extract data from the Internet sources 66 (such as zap2it, the Internet Movie Database (IMDb)) that provide semi-structured data (e.g., an electronic program guide (EPG)). The SDEA 110 provides functionalities to extract data from Internet sources (e.g., a compact disk database (CDDB)) that provide structured music metadata. The BDEA 112 provides functionalities to extract and analyze closed-caption data from broadcast TV programs using Broadcast Unstructured Data Sources 67. The LCG 114 provides functionalities to extract and aggregate content (audio, video) available on local sources 69 (e.g., meta-data information on one or more home devices).

Generating Related Data

The related data generation function 35 coordinates the process for determining terms, including keywords and/or phrases, related to content accessed by the user (e.g., a TV program), and displaying the related data on a user interface of the client module 64 for the use to select among the terms for further information. In one example, the client module 64 is implemented in the DTV 30, such that when a user presses the "Info" button on the DTV remote control 31 (while watching a TV program on the DTV 30), the client module 64 requests the related data generation function 35 of the information gathering component 23 for terms related to the TV program. The related data generation function 35 invokes a getRelatedKeywords( ) interface in the QEP 118 for such terms. Consequently, the QEP 118 looks to its Plan Library 124 to identify the appropriate plan to execute in order to resolve the request from the related data generation function 35. An example of an identified plan is getRelatedKeywords.xml in Table 1 below:

TABLE 1 getRelatedKeywords.xml

```
<?xml version="1.0" ?>
<plan>
  <planstep>
    <RuleLet>GetDataRule</RuleLet>
    <OutputType>CCKeywords</OutputType>
    <Scope>Local</Scope>
  </planstep>
</plan>
```

The QEP 118 then passes on the above-identified plan to the CPE 120 for execution. The plan triggers the invocation of a RuleLet 126 (e.g., "GetDataRuleLet"). Based on the output type set in the plan (e.g., closed-caption keywords or "CCKeywords"), the GetDataRuleLet first identifies (from the Information Source Directory 127) that the BDEA 112 is to be used to extract the required data (terms). Then, a query object is constructed using the fields in the plan and any input parameters passed on by the QEP 118. The constructed query object has the following fields: with input set as "none", output set as "CCKeywords" and scope set as "local." Then, the CPE 120 passes on the query object to the BDEA 112 for data extraction using the DEP 108 according to the query object fields, which returns a list of terms to the CPE 120. The extracted/obtained terms are related to the content being accessed by the user (e.g., a currently broadcasted TV program). The extracted terms are displayed as a list in a keyword menu UI 64A by the client module 64 as suggestions of information the user may be interested in because they relate to the content being accessed by the user. The CPE 120 returns this list of keywords to the client module 64 through the QEP 118.

A search for information related to the extracted terms is conducted under direction of the related data generation function 35 and the search results are displayed to the user on the search results menu UI 64B of the client module 64. Specifically, the related data generation function 35 requests the QEP 118 for Internet search results related to the first term on the list. For example, the getRelatedInternetLinks( ) interface of the QEP 118 is invoked with the first term (e.g., "Canadian") as the input parameter for the interface. Consequently, the QEP 118 looks to its Plan Library 124 to identify the appropriate plan to execute (e.g., getRelatedInternetLinks.xml) in order to resolve the request. The QEP 118 passes the plan to the CPE 120 for execution. An example of getRelatedInternetLinks.xml plan is in shown Table 2 below:

TABLE 2 getRelatedInternetLinks.xml

```
<?xml version="1.0" ?>
<plan>
  <planstep>
    <RuleLet>GetDataRule</RuleLet>
    <OutputType>SponsoredLinks</OutputType>
    <Scope>SamsungServer</Scope>
  </planstep>
  <planstep>
    <RuleLet>GetDataRule</RuleLet>
    <OutputType>SearchResults</OutputType>
    <Scope>Internet</Scope>
  </planstep>
  <planstep>
    <RuleLet>MergeDataRule</RuleLet>
    <InputType>SamsungServer-SponsoredServices</InputType>
    <InputType>Internet-SearchResults</InputType>
    <OutputType>InternetLinks</OutputType>
    <Scope>CIWorkspace</Scope>
  </planstep>
</plan>
```

The first step in the plan triggers the invocation of a RuleLet (e.g., "GetDataRuleLet"). Based on the output type set in the plan-step, the GetDataRuleLet first identifies (from the Information Source Directory 127) that an extraction plug-in 29 is to be used to extract the required data. Then, a query object is constructed using the fields in the plan and any input parameters passed on by the QEP 118 ("Canadian" in this case). Then the CPE 120 passes on the query object to the plug-in 29. The plug-in 29 obtains all available links for the keyword passed as input (i.e., "Canadian") from the Internet data sources 66. The CPE 120 stores the obtained list of links in its workspace 121 and executes the next step in the plan.

The second step in the plan triggers the invocation of the "GetDataRuleLet" again. Based on the output type and scope set in the plan-step (e.g., "SearchResults" and "Internet" in this case), the GetDataRuleLet identifies (from the Information Source Directory 127) that the UDEA plug-in 102 is to be used to extract the required data. Then, a query object is constructed using the fields in the plan and any input parameters passed on by the QEP 118 (i.e., "Canadian"). The constructed query object has the following fields: input set as "Canadian", output set as "SearchResults" and scope set as "Internet." Then, the CPE 120 passes on the query object to the UDEA plug-in 102 which queries a search engine with the keyword passed as input ("Canadian"), and provides to the CPE 120 search results returned by the search engine. In one example, the Yahoo search engine is used to obtain the top 20 search results for a keyword.

The CPE 120 stores the search results in its workspace 121 and executes the next step in the plan. The third step in the plan triggers the invocation of the "MergeDataRuleLet". Based on inputTypes set in the plan-step, the MergeDataRuleLet retrieves the data with specified type "Local" and data with type "Internet-SearchResults" from the workspace 121, merges them and passes the merged result (i.e., a list of Internet links and search results) to the client module 64 (via the CPE 120, the QEP 118 and the related data generation function 35).

Upon receiving the merged results, including a list of Internet links comprising sponsored links and search results, the client module 64 displays the list of Internet links on a user interface 64B with the list of keywords related to the TV program, and the related Internet links.

Suggesting Search Queries

If the user selects a keyword from the list of keywords related to the currently broadcasted TV program (i.e., the list of keywords returned above by the BDEA plug-in 112), the client module 64 requests the information gathering component 23 for search results for the currently selected keyword.

Figure 4A:
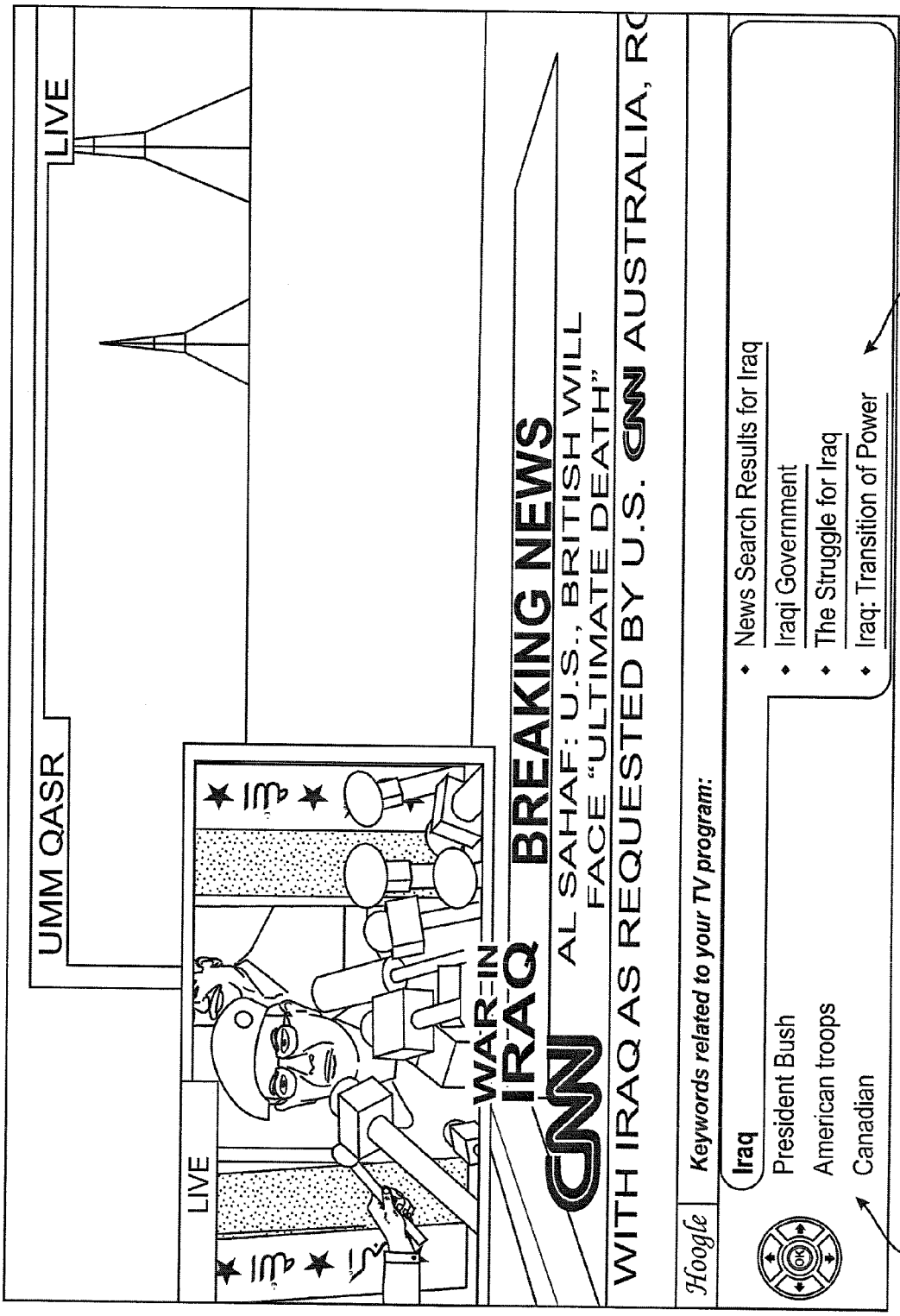
FIGS. 4A-C show example user interface (UI) screens, according to the present invention.
Figure 4B:
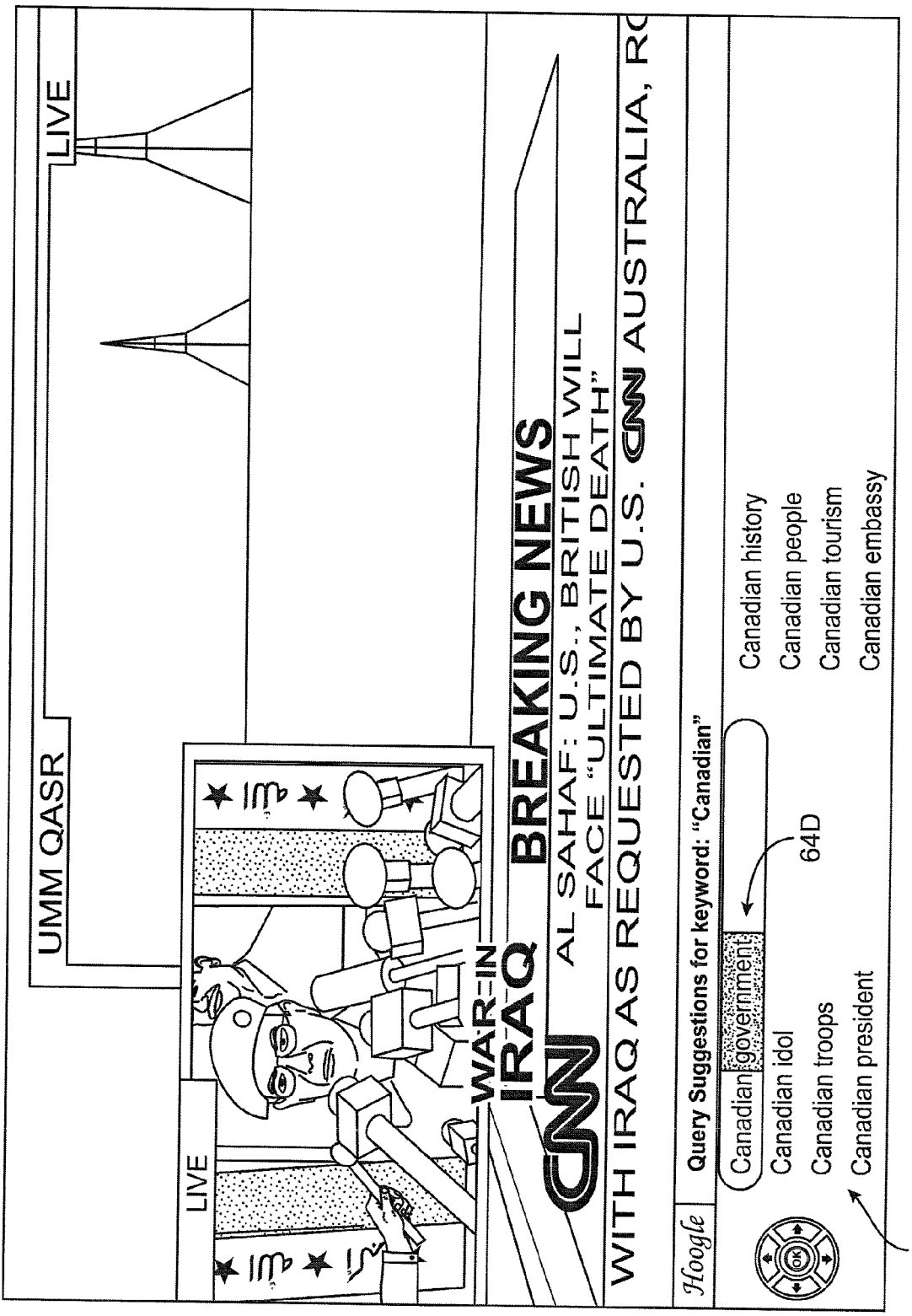
Figure 4C:
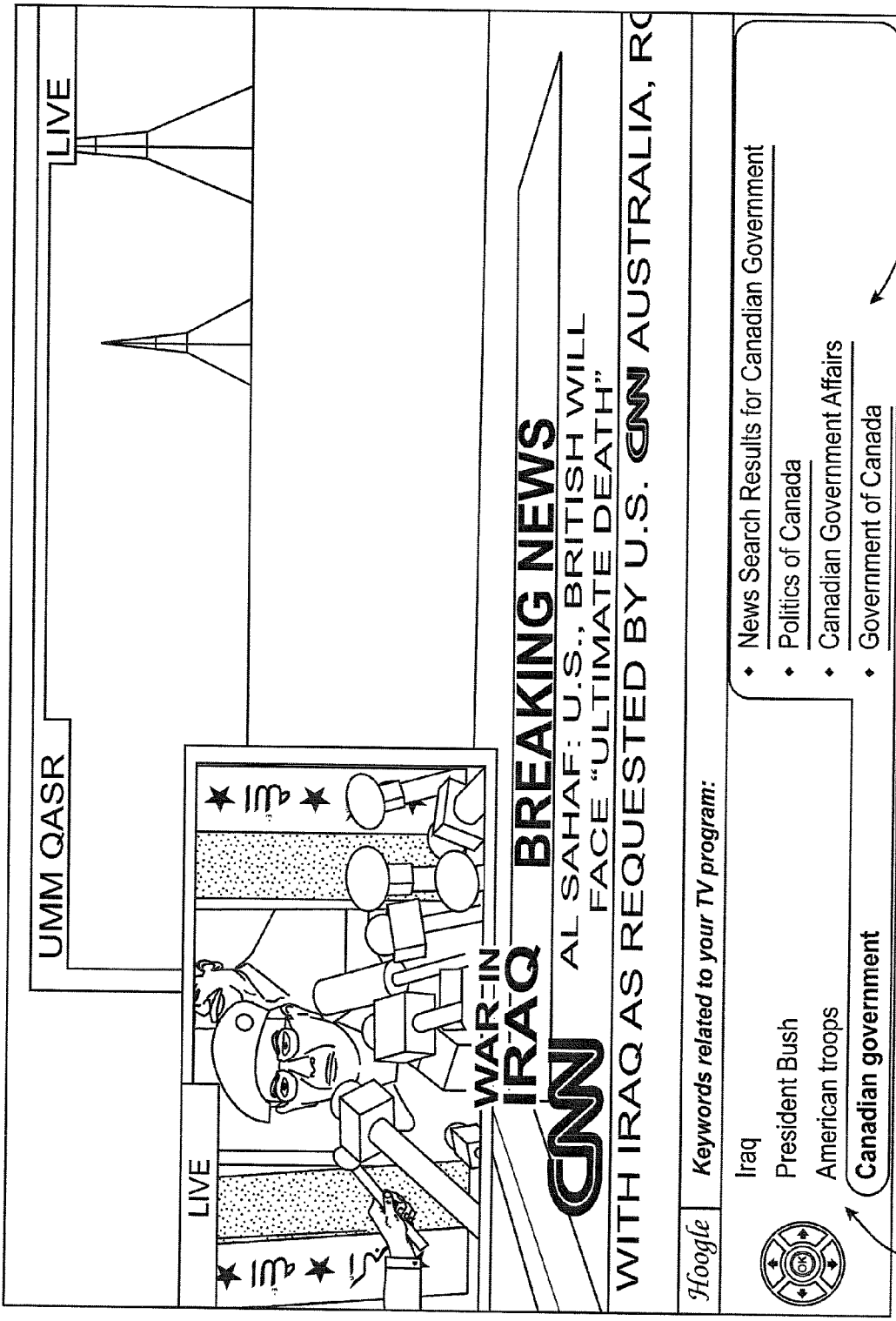

FIGS. 4A-C show example user interface screens, according to the present invention. FIG. 4A shows an initial keyword menu 64A. FIG. 4B shows a query suggestion menu 64C for a selected keyword from keyword menu 64A. FIG. 4C shows the keyword menu 64A updated with a query suggestion selected by the user from the query suggestion menu in 64B in FIG. 4B.

Specifically, FIG. 4A shows an example UI screen, wherein a user is watching a program on American and Canadian troops in Iraq, wherein the keywords "Iraq", "President Bush", "American troops", and "Canadian" are listed. The query suggestion function 37 coordinates forming and suggesting queries that are relevant to a keyword selected by the user. When a user chooses a keyword displayed on the keyword menu 64A (e.g., "Canadian") and presses, e.g., an "edit" button on the TV remote control 31, the client module 64 requests the query suggestion function 37 for more related keywords that start with the selected keyword "Canadian". The query suggestion function 37 invokes a getKeywordsStartingWith (chosenKeyword) interface of the QEP 118 for such related keywords. The QEP 118 then passes the keyword "Canadian" as the parameter for said interface to look up in its plan library 124 to identify the appropriate plan to execute (getKeywordsStartingWith.xml), in order to resolve the user request. An example of the plan (getKeywordsStartingWith.xml) is shown in Table 3 below:

TABLE 3 getKeywordsStartingWith.xml

```
<?xml version="1.0" ?>
<plan>
  <planstep>
    <RuleLet>GetDataRule</RuleLet>
    <OutputType>CCKeywordPhrases</OutputType>
    <Scope>Local</Scope>
  </planstep>
  <planstep>
    <RuleLet>GetDataRule</RuleLet>
    <OutputType>SnippetKeywordPhrases</OutputType>
    <Scope>Internet</Scope>
  </planstep>
  <planstep>
   <RuleLet>MergeDataRule</RuleLet>
   <InputType>Local-CCKeywordPhrases</InputType>
     <InputType>Internet-SnippetKeywordPhrases</InputType>
     <OutputType>KeywordIndex</OutputType>
         <Scope>CIWorkspace</Scope>
   </planstep>
   </plan>
```

The QEP 118 then passes the plan in Table 3 to the CPE 120 for execution. The CPE 120 parses the plan for execution, wherein the first step in the plan triggers the invocation of the "GetDataRuleLet." Based on the output type set in the plan-step (i.e., "CCKeywordPhrases" in this case), the GetDataRuleLet first identifies (from the Information source directory) that the BDEA plug-in 112 should be used to extract the required data. Then, a query object is constructed using the fields in the plan and the input parameters passed on by QEP 118 (e.g., keyword "Canadian"). The constructed query object has the following fields: with input set as "keyword=Canadian", output set as "CCKeywordPhrases", scope set as "local." Then the query object is passed on to the BDEA 112.

On receiving the query, the BDEA 112 identifies all keywords and phrases containing the word "Canadian" from its internal indexes/modules. In one example, the BDEA 112 retrieves all the phrases containing the word "Canadian" (e.g., "Canadian government", "Canadian troops", etc.) from its local index 33A. Finally, the BDEA 112 returns the list of obtained keywords and phrases to the CPE 120. The LCG 114 also has a local index 33B.

The CPE 120 stores the obtained list of keywords/phrases in its workspace with type set as "Local-CCKeywordPhrases" and executes the second step in the plan in Table 3. The second step in the plan triggers the invocation of the "GetDataRuleLet" again. Based on the output type set in the plan-step (i.e., "SnippetKeywordPhrases"), the GetDataRuleLet first identifies (from the Information source directory) that the UDEA plug-in 102 should be used to extract the required data. Then, a query object is constructed using the fields in the plan and the input parameters passed on by the QEP 118 (e.g., "Canadian"). The constructed query object includes the following fields: with input set as "keyword=Canadian", output set as "SnippetKeywordPhrases", scope set as "Internet." The query object is passed to the UDEA 102.

On receiving the query object (i.e., request), the UDEA 102 sends the keyword in the query (i.e., "Canadian") to a search engine in the Internet sources 66 for searching. The UDEA 102 obtains snippets for the search results provided by the search engine, and analyzes the snippets to extract useful keywords and phrases (e.g., "history", "people", "troops", etc.), and stores them in a search index 39 along with the original query (e.g., "Canadian history", "Canadian people", "Canadian tourism"). Finally, the UDEA 102 returns the identified keywords and phrases as related query suggestions to the CPE 120.

The CPE 120 stores the search results in its workspace with type set as "Internet-SnippetKeywordPhrases" and executes the third step in the plan in Table 3. The third step in the plan triggers the invocation of the "MergeDataRuleLet." Based on inputTypes set in the plan-step, MergeDataRuleLet retrieves the data with type "Local-CCKeywordPhrases" and data with type "Internet-SnippetKeywordPhrases" from the workspace, merges them and passes it on to the QEP 118. The QEP 118 in turn passes on the merged results containing the selected/chosen keyword "Canadian" (e.g., "Canadian government", "Canadian troops", "Canadian history", "Canadian people", "Canadian tourism" etc.) to the query suggestion function 37. Under the control of the query suggestion function 37, the client module 64 displays the merged results as a list of keyword/phrase suggestions related to the chosen keyword "Canadian" on a user interface (UI) for user interaction (e.g., query suggestion menu 64C in FIG. 4B). Alternatively, the query suggestion function 37 and/or client module 64 may pass the merged results as a list of keyword/phrase suggestions to a supplementary UI on another client device.

Upon being presented with a list of results as suggestions in the query suggestion menu 64C (FIG. 4B), if the user finds a suggested query (e.g., "Canadian government") interesting, the user can select the query via the client module 64 for execution and review of search results. FIG. 4C shows an example UI screen, wherein "Canadian government" is selected and the user is presented with a list of search results in the search result menu 64B for the user-selected query suggestion, "Canadian government".

In another example, based on NLP (Natural Language Processing) techniques and a dictionary, the root of a word can be used (e.g., the root of the word Canadian is Canada), such that when the user requests for query suggestions, the system obtains suggestions for the actual word (e.g., Canadian) and the root word (e.g., Canada).

Figure 5:
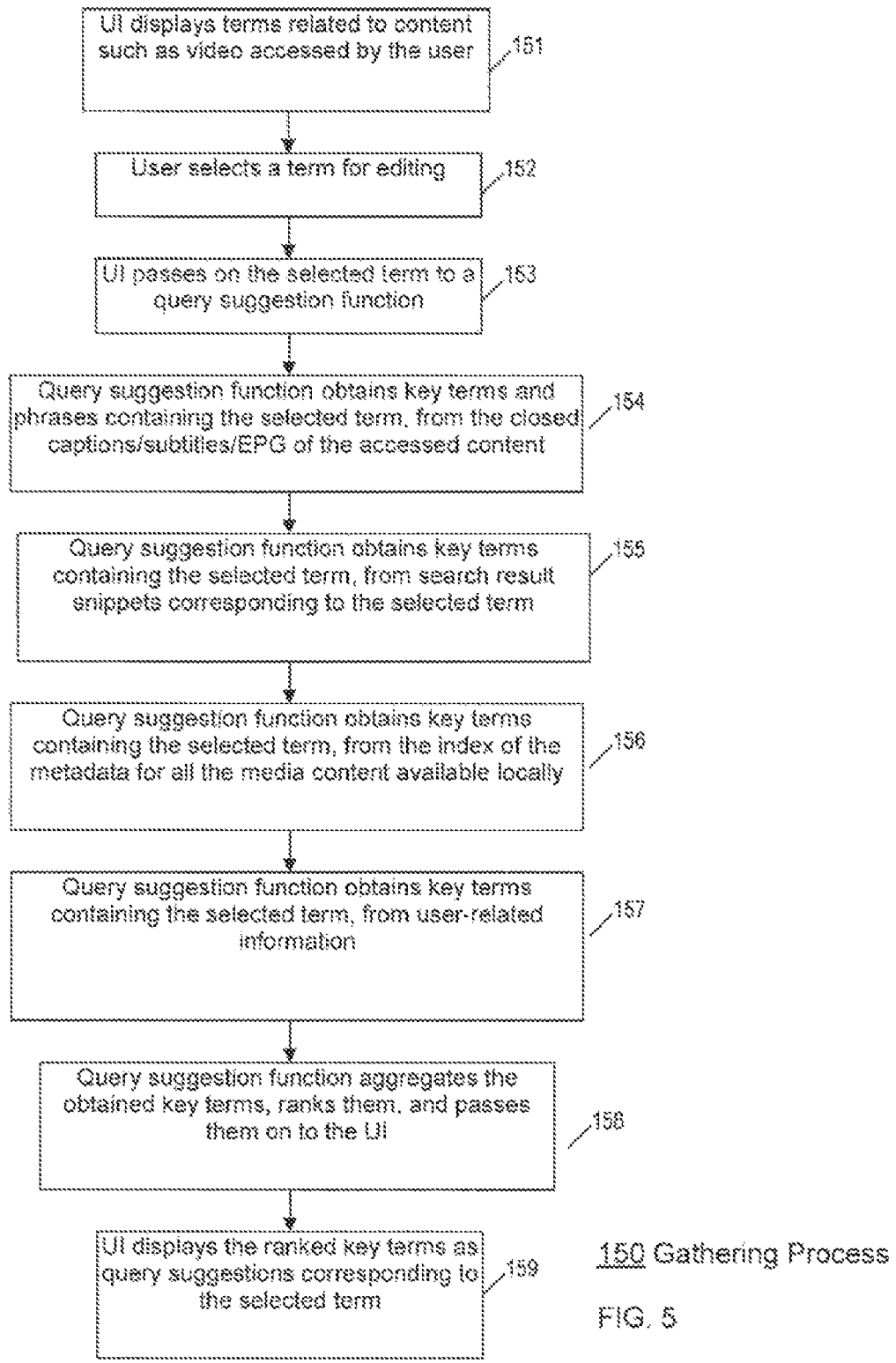
FIG. 5 shows a flowchart of the steps of an information gathering process, including related data generation and query suggestion, according to an embodiment of the present invention.

FIG. 5 shows a flowchart of the steps of an information gathering process 150 for the information gathering component 23, including related data generation and query suggestion, according to an embodiment of the present invention. In an example scenario, a user watching a program (e.g., recorded video or a broadcasted TV program) on the DTV 30, and using the "Info" button of the remote control 31 requests the client module 64 UI to display keywords related to the program. The UI of the client module passes the selected keyword to the related data generation function 35 and in response, the related keyword generation function 35 determines that a set of terms including keywords and search results (e.g., "Iraq", "President Bush", "American troops", "Canadian", etc.) are related to the TV program currently watched by the user, and displays the terms to the user on a UI via the client module 64 of the DTV 30 (Step 151).

The user then selects one of the terms (e.g., "Canadian") and requests the client module 64 to edit the term by pressing the "Edit" button on the remote control 31 (Step 152). The UI of the client module passes the selected term to the query suggestion function 37 (Step 153). Then, in steps 154-157, the query suggestion function 37 then obtains key terms comprising keywords/phrases that contain the selected term, from local and Internet sources using the plug-in functions of the DEP 108. In obtaining key terms, the query suggestion function takes into consideration both local content available from the home devices (e.g., metadata, closed caption information) and the related information available on the Internet sources.

Specifically, the query suggestion function 37 uses the BDEA 112 to obtain key terms including keywords/phrases that contain the term selected by the user for editing, from locally available content information (e.g., from data sources 67 providing metadata, closed-captions/subtitles and/or an EPG) for the content being accessed by the user (Step 154). The query suggestion function 37 further uses one or more of the SSDEA 104, SDEA 110 and UDEA 102, to obtain key terms comprising keywords/phrases that contain the selected term, from Internet search result snippets returned by the Internet sources 66 (Step 155). The query suggestion function 37 further uses the BDEA 112 and/or the LCG 114 to obtain key terms comprising keywords/phrases that contain the selected term, from the local index of metadata related to media content available in the home network 10 (Step 156). The query suggestion function 37 further uses the LCG 114 to obtain key terms comprising keywords/phrases containing the selected term, based on user-related information such as user profile, user preferences, content previously accessed by the user, history of keywords chosen by the user in the past, which contain the selected term, etc., that are indicative of user interests (Step 157).

The query suggestion function 37 then aggregates the obtained key terms related to the selected term, and ranks them such as based on user history and preferences (Step 158). The UI of the client module 64 then displays the ranked key terms to the user as query suggestions corresponding to the selected term (Step 159). The user can select among the suggested queries for execution (e.g., searching and view of search results), or further refinement by selecting a suggested query and pressing "Edit" on the remote control 31 repeating steps 152-159.

The process 150 allows searching for Internet information on CE devices that do not have a keyboard or a mouse. It allows users to access/browse Internet information related to content they access, without having to enter queries. The keyword menu 64A (FIG. 3) in the UI of the client module displays a list of terms related to the accessed content (e.g., video being currently watched), the user selects one or more terms from the keyword menu (i.e., selected keyword or category) as a query for searching, and a list of search results corresponding to the search query specified by the user are obtained and displayed in a search results menu 64B of the UI display.

The client module may support different types of user interfaces to allow users to edit a term. One example involves highlighting a term for editing in the UI, and allowing the user to enter new characters in the highlighted segment 64D in FIG. 4B. Another example involves displaying a selected term in an editable text box on the top part of the same UI, for editing. The edited term can be executed as a query.

The client module may support different types of user interfaces to allow users to browse/choose from the query suggestions. One example involves displaying auto-complete query suggestions for the selected term (e.g., FIG. 4B). Another example involves displaying auto-complete query suggestions for the selected term on a UI of another client module (e.g., on a supplementary device).

An example operation scenario for a user, John, based on the embodiments illustrated in FIGS. 3-4, includes the following steps:

a) John powers on his DTV 30 and starts watching a program about American and Canadian troops in Iraq on a TV channel that provides closed-captions for the program.

b) John presses the "Info" button on the remote control (RC) 31 of the DTV, requesting more information about the program.
c) The client/UI 64 on the DTV passes on John's request to the information gathering function 23 (i.e., related data generation function 35 in the CF 106).
d) Under direction of the related data generation function 35, the CF 106 utilizes the BDEA 112 to identify terms related to the program, and returns them to the client module 64.
e) The client module 64 displays the related terms returned by the CF 106 to the user in the keyword menu 64A on the DTV screen, as suggested related information. In this example, the client module 64 displays the following list of terms returned by the CF 106, "Iraq", "President Bush", "American troops" and "Canadian", as shown in FIG. 4A.
f) John realizes the query he had in mind (which is "Canadian government") is not in the list of terms related to the program that is displayed in the keyword menu 64A.
g) John selects the term "Canadian" in the keyword menu 64A and presses the "Edit" button on the RC 31.
h) The client module 64 passes on the selected term "Canadian" to the CF 106, to request more suggestions. As described below, the BDEA 112 obtains the closed-captions text for the program and the UDEA 102 obtains snippets containing the selected term through Internet search engines.
i) Under direction of the query suggestion function 37, the CF 106 passes on the selected term "Canadian" to the BDEA 112 to obtain more keywords and phrases containing the selected term "Canadian" from the closed-captions of the TV program John is watching. In this example, the BDEA 112 returns the following keywords/phrases to the CF 106: "Canadian troops", "Canadian president", and "Canadian government."
j) Under direction of the query suggestion function 37, the CF 106 also passes on the selected term "Canadian" to the UDEA 102 to obtain more keywords and phrases containing the selected term "Canadian", from Internet search result snippets corresponding to the selected term. In this example, the UDEA 102 returns the following keywords/phrases to the CF 106: "Canadian history", "Canadian people", "Canadian tourism", "Canadian idol".
k) Under direction of the query suggestion function 37, the CF 106 also passes on the selected term "Canadian" to the Local Content Gatherer (LCG) 114 to obtain more keywords and phrases containing the selected term "Canadian" from John's profile, preferences and history of keywords chosen by John. In this example, the LCG 114 returns the following keywords/phrases to the CF 106: Canadian government, Canadian idol.
l) The query suggestion function 37 aggregates the keywords/phrases obtained in steps j-l and ranks them based on John's history of chosen keywords. In this example, the ranked list of aggregated keywords/phrases includes: "Canadian government", "Canadian idol", "Canadian troops", "Canadian president", "Canadian history", "Canadian people", "Canadian tourism".
m) The CF 106 returns the above aggregated list—complete suggestions to the client/UI 64.
n) The client/UI 64 displays the suggestions to the user in a query suggestions menu 64C (e.g., FIG. 4B). The first query suggestion 64D is automatically highlighted and allows John to enter or delete any characters.
o) John is happy to see the query he had in mind ("Canadian Government") in the suggestion list 64C and selects it to obtain more information about Canadian government as search results in menu 64B, as shown in FIG. 4C.
p) Upon John's selection, the keyword menu 64A is updated to show "Canadian Government" as the highlighted keyword and search results related to this keyword are shown in menu 64C in FIG. 4C.

The remote control 31 may include an alphabetic or alphanumeric keypad for text entry. Alternatively, the remote control may be an essentially conventional remote control and the client displays a keyboard map on the screen for the user to select characters from, or the client may display a UI on another device in the network (e.g., cell phone or a tablet PC) that has a keypad and allows for editing text.

Figure 6:
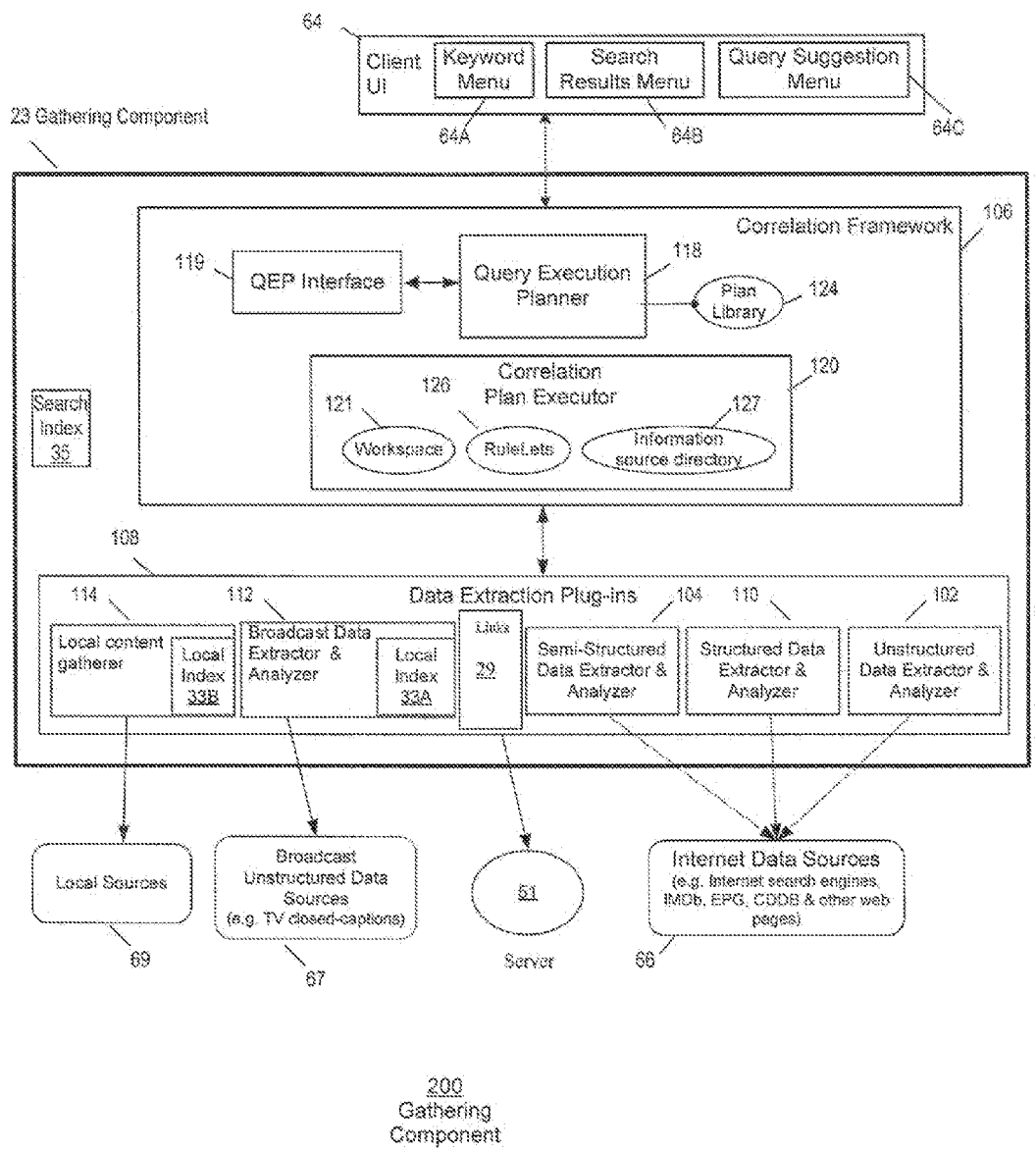
FIG. 6 shows a functional block diagram of another example information gathering component for suggesting search queries, according to the present invention.

FIG. 6 shows a functional block diagram of another example information gathering component 200 for suggesting search queries, according to the present invention. Specifically, FIG. 6 shows an example of the information gathering component 23 of the architecture 60 (FIG. 2), configured for TV hardware or a set-top box platform, for suggesting/refining queries. In FIG. 6, the related data generation function and the query suggestion function are implemented as query plans in the plan library 124 for access and execution by the QEP 118. The plan library 124 specifies plans for the related data generation function and the query suggestion function, and the client module 64 can request the QEP 118 for related data or query suggestions, and QEP executes the corresponding plans.

For example, a plan specifies the steps to obtain related data, and the QEP executes this plan (using the underlying Data Extraction plug-ins). The search for related information is conducted if the user chooses a keyword through the client module and the client module invokes a QEP interface 119 to obtain related information (links) while passing on a user-selected keyword. The QEP returns related data and query suggestions directly to the client module. The related data generation function and the query suggestion function can be implemented by the Data Extraction plug-ins 108.

As is known to those skilled in the art, the aforementioned example architectures described above, according to the present invention, can be implemented in many ways, such as program instructions for execution by a processor, as logic circuits, as an application specific integrated circuit, as firmware, as a program product stored on a computer useable medium for execution on a processor (e.g., CPU, microcontroller), etc. The present invention has been described in considerable detail with reference to certain preferred versions thereof; however, other versions are possible. Therefore, the spirit and scope of the appended claims should not be limited to the description of the preferred versions contained herein.

What is claimed is:
1. A method for suggesting search queries on an electronic device, comprising:
receiving a request to access content from a user, wherein the content is a television program;
accessing information about the television program;
extracting, from the information about the television program, a first set of key terms related to the content currently accessed by a user by the electronic device without requiring user input;
displaying the first set of key terms for selection by the user;
receiving a selection of one of the key terms from the first set of key terms from the user;

automatically obtaining a second set of key terms related to the user selected key term from the first set of key terms, based on both local content information from available local content information and search result snippets from external content information;
aggregating and ranking the key terms from the second set of key terms;
displaying the second set of key terms based on rank to the user as query suggestions corresponding to the selected term;
receiving a selection from the user of one of the query suggestions; and
submitting the selected query suggestion as a query to retrieve additional content, wherein the extracting, displaying, automatically obtaining, aggregating, and displaying are all performed prior to a query being submitted.

2. The method of claim 1, wherein extracting a first set of key terms includes automatically obtaining key terms from one or more of closed-captions, subtitles and Electronic Program Guide (EPG), for the content.

3. The method of claim 1, wherein extracting a first set of key terms includes obtaining key terms from a local index of metadata related to the content.

4. The method of claim 1, wherein extracting a first set of key terms includes obtaining key terms from user-related information.

5. The method of claim 4, wherein the user-related information includes one or more of: user profile, user preferences, content previously accessed by the user, terms previously selected by the user.

6. The method of claim 1, wherein the electronic device comprises a consumer electronics (CE) device.

7. The method of claim 1, wherein the aggregated key terms are ranked based on user-selected search term history and user preferences.

8. The method of claim 1, wherein extracting initial terms related to content accessed by a user comprises extracting initial terms from content accessed by the user.

9. The method of claim 8, wherein extracting initial terms from content accessed by the user comprises extracting initial terms based on locally available content information.

10. The method of claim 9, wherein the locally available content information comprises closed-caption information.

11. The method of claim 1, wherein the electronic device is a digital television (DTV).

12. The method of claim 11, wherein the query suggestions corresponding to the selected term are displayed on the DTV.

13. The method of claim 12, wherein a user selects search terms via a remote control without entering query terms.

14. An apparatus for suggesting search queries on an electronic device, comprising:
a processor including a related data generation function configured for initiating extraction of initial terms related to content of a television program currently accessed by a user by the electronic device without requiring user input, displaying the initial terms for selection by the user, and receiving a selection of a term from the initial terms from the user;
a query suggestion function configured for automatically obtaining key terms related to a selected term selected from the initial terms, based on both local available content information and search result snippets from external content information, aggregating and ranking the key terms, and for displaying the key terms based on rank to the user as query suggestions corresponding to the selected term; and
a query submission module configured for submitting at least one of the query suggestions as a query for additional content, wherein the extraction, displaying the initial terms, automatically obtaining, aggregating, and displaying the key terms are all performed prior to a query being submitted.

15. The apparatus of claim 14, wherein the query suggestion function includes:
a local information extractor configured for obtaining key terms related to the selected term based on locally available content information;
an external information extractor configured for obtaining key terms related to the selected term based on information available on external sources; and
the apparatus further including an aggregation function configured for aggregating the obtained key terms for display as query suggestions.

16. The apparatus of claim 15, wherein the local information extractor is further configured for obtaining key terms that contain the selected term, from one or more of closed-captions, subtitles and Electronic Program Guide (EPG), for the user accessed content.

17. The apparatus of claim 15, wherein the local information extractor is further configured for obtaining key terms that contain the selected term, from a local index of metadata related to locally available media content.

18. The apparatus of claim 15, wherein the local information extractor is further configured for obtaining key terms that contain the selected term, from user-related information.

19. The apparatus of claim 18, wherein the user-related information includes one or more of: user profile, user preferences, content previously accessed by the user, terms previously selected by the user.

20. The apparatus of claim 15, wherein the external information extractor is further configured for obtaining key terms that contain the selected term based on information available on Internet sources.

21. The apparatus of claim 15, wherein the external information extractor is further configured for obtaining key terms that contain the selected term, from Internet search result snippets.

22. The apparatus of claim 21, wherein obtaining key terms that contain the selected term from Internet search results snippets further comprises:
sending the selected term to a search engine in the Internet;
obtaining search result snippets for the selected term from the search engine; and
analyzing search result snippets for key terms that contain the selected term.

23. The apparatus of claim 14, wherein the electronic device comprises a consumer electronics (CE) device.

24. The apparatus of claim 14, further including a client module is configured for providing a user interface for displaying the key terms to the user as query suggestions corresponding to the selected term.

25. A system for suggesting search queries, comprising:
an electronic device including a processor coupled with a client module configured for connection to a local network;
an information gathering function configured for suggesting search queries via the client module, the information gathering function comprising a related data generator configured for initiating extraction of initial terms related to content of a television program currently accessed by a user without requiring user input displaying the initial terms for selection by the user, and receiving a selection of initial terms from the user, and a query suggestion function configured for automatically obtaining key terms related to a selected term selected from the initial terms, based on both available local content information and search result snippets from external content information, aggregating and ranking the key terms, and for displaying the key terms based on rank to the user as query suggestions corresponding to the selected term; and a query submission module configured for submitting at least one of the query suggestions as a query for additional content, wherein the extraction, displaying the initial terms, automatically obtaining, aggregating, and displaying the key terms are all performed prior to a query being submitted.

26. The system of claim 25, wherein the query suggestion function includes:

a local information extractor configured for obtaining key terms related to the selected term based on locally available content information;

an external information extractor configured for obtaining key terms related to the selected term based on information available on external sources; and the system further including an aggregation function configured for aggregating the obtained key terms for display as query suggestions.

27. The system of claim 26, wherein the query suggestion function is further configured for ranking the aggregated key terms for display as query suggestions.

28. The system of claim 26, wherein the local information extractor is further configured for obtaining key terms that contain the selected term, from one or more of closed-captions, subtitles and Electronic Program Guide (EPG), for the user accessed content.

29. The system of claim 26, wherein the local information extractor is further configured for obtaining key terms that contain the selected term, from a local index of metadata related to locally available media content.

30. The system of claim 26, wherein the local information extractor is further configured for obtaining key terms that contain the selected term, from user-related information.

31. The system of claim 30, wherein the user-related information includes one or more of: user profile, user preferences, content previously accessed by the user, terms previously selected by the user.

32. The system of claim 26, wherein the external information extractor is further configured for obtaining key terms that contain the selected term based on information available on Internet sources.

33. The system of claim 26, wherein the external information extractor is further configured for obtaining key terms that contain the selected term, from Internet search result snippets.

34. The system of claim 25, wherein the client module comprises a consumer electronics device configured for providing a user interface for displaying the key terms to the user as query suggestions corresponding to the selected term; and wherein the client module and the information gathering module are further configured for communication via the network.

35. A program product stored on a computer for suggesting search queries on an electronic device, the program product comprising program code for causing a processor to:

initiate extraction of initial terms related to content of a television program currently accessed by a user without requiring user input;

display the initial terms for selection by the user;

receiving a selection of initial terms from the user;

automatically obtain key terms related to a user-selected term selected from the initial terms, based on both available local content information and search result snippets from external content information;

aggregate and rank the key terms;

display the key terms based on rank to the user as query suggestions corresponding to the selected term; and submit at least one of the query suggestions as a query for additional content, wherein the extraction, displaying the initial terms, automatically obtaining, aggregating, and displaying the key terms are all performed prior to a query being submitted.

* * * * *